J. E. VAN WINKLE.
Cotton Cleaner and Opener.
No. 38,794. Patented June 2, 1863.
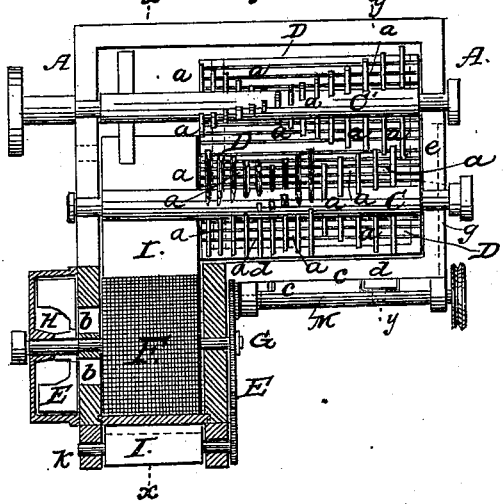
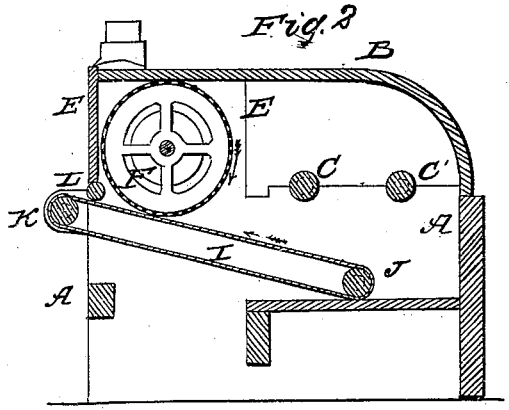
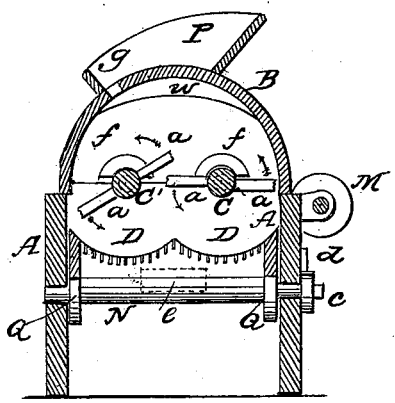

UNITED STATES PATENT OFFICE.

JOHN E. VAN WINKLE, OF PATERSON, NEW JERSEY.

IMPROVEMENT IN MACHINES FOR CLEANING AND OPENING COTTON, &c.

Specification forming part of Letters Patent No. 38,794, dated June 2, 1863.

*To all whom it may concern:*

Be it known that I, JOHN E. VAN WINKLE, of Paterson, in the county of Passaic and State of New Jersey, have invented a new and Improved Machine for Cleaning and Opening Cotton and other Fibrous Materials; and I do hereby declare that the following is a full, clear, and exact description of the same, reference being had to the accompanying drawings, forming a part of this specification, in which—

Figure 1 is a horizontal section of the machine taken just above the several shafts. Fig. 2 is a vertical section of the same in the plane indicated by the line $x\ x$, in Fig. 1. Fig. 3 is a vertical section of the same in the plane indicated by the line $y\ y$ in Fig. 1.

Similar letters of reference indicate corresponding parts in the several figures.

My said invention relates to that class of machines in which a pair of parallel shafts with intersecting arms are employed, in connection with a grating, a carrying-apron, a rotary screen, and a suction fan, to separate the fiber of cotton and remove impurities therefrom.

The present invention particularly consists in certain improved combination and arrangement of parts whereby the apparatus is adapted to operate with greater effect, as will be hereinafter explained.

To enable others skilled in the art to make and use my invention, I will proceed to describe its construction and operation.

A is an oblong box or casing covered with a hood, B, and constructed with suitable bearings for the two horizontal shafts, C C', which run lengthwise through it. These shafts are arranged parallel with each other, and furnished with teeth or beaters $a\ a$, arranged upon them in either straight or spiral rows in such manner that those of each shaft revolve between those of the other one, and the said shafts are combined either by belts or gearing to rotate in opposite directions.

D is the grating, arranged under the said shafts, and made with two curves in a transverse direction to conform nearly to the circles described by the extremities of the teeth or beaters, as shown in Fig. 3. On the top of the hood, near one end of the machine, is a hopper, P, for feeding in the cotton, and close to the other end there is, on one side of the machine, a box, E, having an uninterrupted communication with the box A, and containing the rotary screen F, the shaft G of which is arranged horizontally and parallel with the shafts C C' in suitable bearings. The two series of pickers or beaters $a\ a$ on the shafts C C' are not continued along the portions of shafts opposite to the box E', but are arranged along the whole of the remainder of their length, as shown in Fig. 1, and the grating D is only continued as far as the teeth or beaters.

H is the rotary suction-fan, arranged on one side of the box E, with its axis in line with the axis of the screen, and communicating with the interior of the screen through an opening, $b$, in the side of the box E I is an endless apron running on two drums, J and K, arranged parallel with the shafts C C', and extending from the end of the grating within the box A through the box E, and out through an opening in the back of the said box, as shown in Figs. 1 and 2. This apron is close under the rotary screen.

L is a roller arranged above the apron, where it passes out through the back of the box, and capable of rotating by the friction of the apron or of the cotton upon it.

In that end of the box A next to which the hopper P is placed there are openings $f\ f$ above the grating, and an opening, $e$, below the grating, for the admission of air, the latter being fitted with a slide, $g$, by which to close it more or less to regulate its effective size.

The shaft C is the driving-shaft of the machine. It transmits motion to the rotary screen through the agency of a shaft, M, arranged at the back of the box A, the said shaft M receiving motion through a belt or gearing, and being geared with the shaft of the screen in such manner as to cause the latter to rotate very slowly. The apron I receives motion from the shaft of the screen by means of suitable gearing. The fan is driven at a high velocity by a belt from a pulley on one of the shafts C C'.

N N are two shafts arranged horizontally below and transversely to the grating D, and each carrying two cams, Q Q, for the purpose of supporting and raising and lowering the grating, which is fitted to the box in a suitable manner to permit of its being raised and lowered. These shafts are to be turned by a crank or its equivalent applied outside of the box A, and the position of the cams is retained by means of ratchet-wheels *c c* on the shafts and pawls *d d*, attached to the outside side of the box A. Instead, however, of these shafts and cams, screws or other devices may be employed to adjust the grating at a desirable distance from the teeth or beaters, according to the length or condition of the fiber to be opened and cleaned.

In the operation of the machine the cotton is fed into the hopper P, and through its opening *g* in the hood, and is then taken by the teeth or beaters, and by the action of the two series, in combination with each other and with the grating D, is picked and opened, and as fast as the fibers are opened they are drawn toward the box E by the draft of the fan and the currents of air, which are thereby drawn into the box A through the openings *f f* and *e*, above and below the grating. The opening proceeds as the fibers pass on toward the box E, and, after having been subjected to the action of all the teeth or beaters, is perfectly open and loose, in which condition it is drawn by the draft of the fan onto the surface of the rotating cylindrical screen F, by which it is carried round and delivered to the apron I in a uniform sheet, the roller L assisting the apron in taking it from the screen and in discharging it from the box E, whence it may be received upon a roll or by other means. In the above operation the heavier dirt drops through the grating and the dust is drawn off through the rotating screen by the action of the fan and discharged from the latter.

The operation may be expedited by the arrangement of spiral ribs *w* in the interior of the hood B, for the purpose of assisting and regulating the passage of the cotton.

The object of the longitudinal arrangement of the beaters C C′ *a* is to compel the cotton in passing from the feed-aperature *g* to the apron I to pass along the shafts C C′ from end to end, and thus subject it to repeated action of the teeth *a a*, instead of but a single action, as is the case with machines in which the cotton passes transversely across the said shafts.

I do not claim, broadly, the application to cotton-cleaning machinery of a current of air forced through the meshes of a cylindrical screen, as I am aware that machinery has before existed in which this is accomplished by a driving-blast applied to the exterior of the screen. My invention is essentially different from this in employing instead a suction-blast applied to the interior of the screen. A current is thus produced in the same direction, but differing materially in its effects. By the driving-blast a pressure is created within the casing which forces the air out at every crevice, and through the feed and discharge aperatures as well as through the screen, carrying more or less of the material and of the impurities also in directions in which they are not wanted to go; whereas by the use of the suction-blast no pressure is created within the casing, but the current of air assists in forwarding the cotton in the proper direction, assists the action of the screen in distributing the cotton upon the apron, and collects the dust and impurities from all parts of the apparatus to one proper place of discharge.

What I claim as my invention, and desire to secure by Letters Patent, is—

1. The combination of the apron I and fan H with the parallel toothed shafts C C′ *a a*, grid or grating D, and feed aperature *g*, when the said parts are arranged as herein set forth, to cause the cotton to traverse the beaters longitudinally of the shafts C C′ in passing from the feed-aperature *g* to the apron I.

2. The combination of the oblique deflecting ribs *w* with the feed-aperature *g*, longitudinally-operating beaters C C′ *a*, carrying-apron I, and fan H, all arranged in the manner and for the purpose herein set forth.

3. The opening or openings *e*, for the admission of air at the feeding end of the machine beneath the grid or grating D, in the described combination with the said grid or grating, and with longitudinally-operating beaters C C′ *a*, carrying-apron I, and fan H, all arranged and operating as set forth.

4. The eccentric Q, ratchet-wheel *c*, and pawl *d*, or their equivalents, employed in the described combination with the beaters C C′ *a* and grating D, to adjust the latter in its distance from the former.

5. The suction-fan H, communicating with the interior of the rotary screen F in the manner and for the purposes specified, when used in combination with toothed beaters C C′ *a* and apron I, arranged and operated as set forth.

J. E. VAN WINKLE.

Witnesses:
M. S. PARTRIDGE,
DANIEL ROBERTSON.